Nov. 24, 1931.    S. HEILWEIL    1,833,609

STRETCHING DEVICE FOR ANIMAL SKINS USED FOR NECK PIECES

Original Filed March 26, 1928

INVENTOR
Samuel Heilweil
BY
Walter P. Polachek
ATTORNEY

Patented Nov. 24, 1931

1,833,609

UNITED STATES PATENT OFFICE

SAMUEL HEILWEIL, OF NEW YORK, N. Y., ASSIGNOR TO ABRAHAM J. PASSMAN, OF NEW YORK, N. Y.

STRETCHING DEVICE FOR ANIMAL SKINS USED FOR NECK PIECES

Application filed March 26, 1928, Serial No. 264,854. Renewed September 3, 1931.

This invention relates to a new and useful stretching device for animal skins for neck pieces.

The object of the invention is to provide a ready means of stretching the reduced portion of an animal skin, especially fox skins and the like, for the purpose of securing a uniform width of skin as is required for a neck piece such as commonly worn by women.

Another object of the invention is to provide a device of the class described of novel construction and arrangement of parts hereinafter more fully described, claimed and illustrated in the accompanying drawings.

Figure 3:
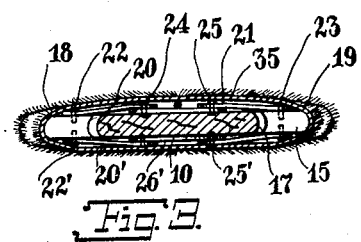
Fig. 3 is an enlarged transverse sectional view taken on the line 3—3 of Fig. 2.
Figure 4:
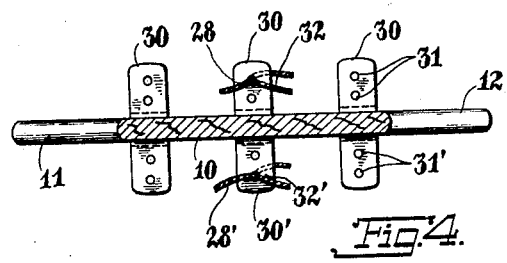
Fig. 4 is a similar sectional view taken on the line 4—4 of Fig. 2.
Figure 5:
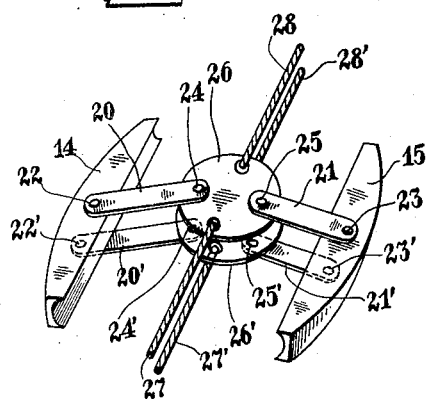
Fig. 5 is a perspective detail view of the stretching device proper as embodied in my improved device.

As here embodied my improved device comprises a body member 10 of plate like construction, comparatively thin and having its opposite longitudinal edges 11 and 12 tapered or converging into a somewhat rounded or curved extremity 13. The above mentioned and described edges 11 and 12 are formed or cut curved or convex as clearly shown in Fig. 3 of the accompanying drawings.

A pair of stretching members 14 and 15 are provided with concave edges 16 and 17 adapted to slidably engage in the above mentioned curved edges 11 and 12 respectively of the body member 10, and are provided with outer arc shaped edges 18 and 19 respectively.

A pair of links 20 and 21 are pivotally secured at one extremity thereof as at 22 and 23 to the stretching members 14 and 15 respectively, in proximity to the central portion thereof, and are extended inwardly therefrom and are similarly secured as at 24 and 25 to a disc 26 positioned or located in the longitudinal central portion of the body member 10.

A second similar pair of links 20' and 21' are pivotally secured at one extremity thereof as at 22' and 23' to the stretching members 14 and 15 respectively, in proximity to the opposite central portion thereof, and are extended inwardly therefrom and are similarly secured as at 24' and 25' to a disc 26', similar to the above mentioned disc 26, similarly positioned relative to the latter mentioned disc 26.

A pair of flexible members 27 and 28 are secured to and oppositely extended from the disc 26. A second pair of flexible members 27' and 28' are secured to the disc 26' and are similarly extended therefrom. Brackets 29 are secured to the body member 10 on one side thereof in proximity to the larger extremity thereof, and are provided with extended elements 30, at approximately a right angle to the main portion thereof. Apertures 31 are formed in the extended elements of the brackets 29, adapted to receive the extended extremity of the flexible member 28 which is secured thereto, as at 32, in the usual manner by the tying of the said flexible member 28.

Brackets like those shown at 29 are also secured to the other side body member 10, and are positioned relatively opposite the above first mentioned brackets 29, and are provided with similar extended elements 30'. Apertures 31' are formed in the extended elements of the second mentioned brackets, adapted to receive the extended extremity of the flexible member 28' secured thereto as at 32' in the usual manner as set forth.

The body member 10 has formed therein, in proximity to the extremity 13 thereof an aperture 33 adapted to receive the extended extremities of the above mentioned flexible members 27 and 27' which are tied together as at 34.

Figure 1:
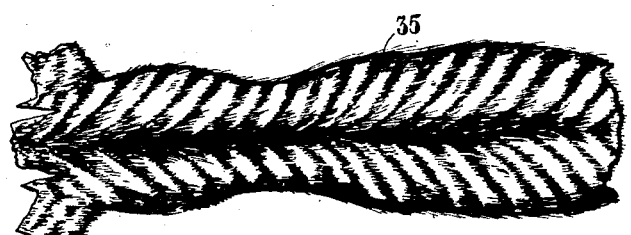
Fig. 1 is a plan view of an animal skin prior to stretching on my improved device.
Figure 2:
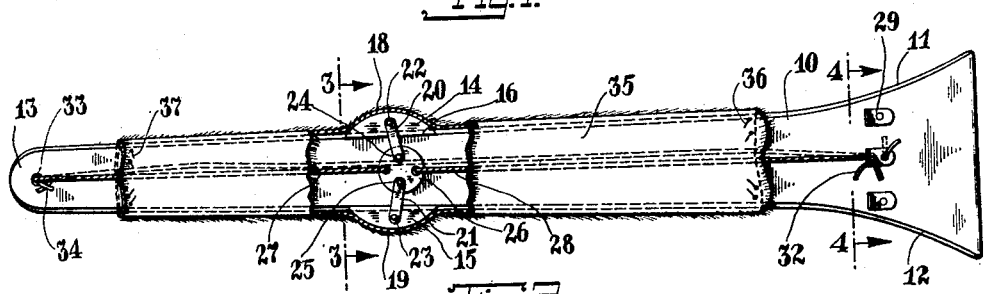
Fig. 2 is a plan view of my improved device as same would appear when inserted in an animal skin, showing same partially removed so as to more clearly illustrate the construction of my improved device.

The functioning and use of my improved device is as follows: The animal skin 35 which is desired to be stretched at the reduced portion thereof, is sewn, stitched or otherwise secured together longitudinally, permitting my improved device to be inserted in the said skin 35, as clearly shown in Figs. 2 and 3. My improved device is inserted in the skin 35, and positioned thereto, so as to permit the reduced portion of the skin 35 to lie in proximity to the extremity 13 of the body member 10. The flexible members 28 and 28' are then pulled tightly, so as to slidably position the stretching members 14 and 15 at the reduced portion of the skin 35, for the purpose as above set forth. The said flexible members 28, 28', 27 and 27' being tied or secured as above set forth, as a means of holding the said stretching members 14 and 15 in the above stated desired position, for a reasonable length of time. A plurality of suitable securing members 36 and 37, nails, staples or the like, may be inserted through the skin 35 in proximity to the extremities thereof, and driven into the body member 10, as a means of holding the skin 35 in a fixed position relative to the body member 10. The extended elements of the brackets 29 and 29' holding the body member 10 in a somewhat angularly raised position on a table, bench or the like, not shown in the accompanying drawings, for the purpose of preventing the securing members 36 and 37 from being misplaced.

Figure 6:
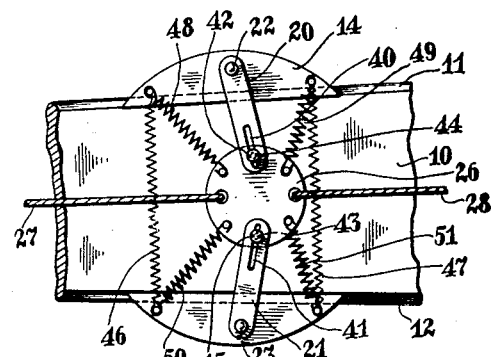
Fig. 6 is a fragmentary top plan view showing in particular a further development of the stretching device.

In Fig. 6 of the accompanying drawings, I have shown elongated openings 40 and 41, respectively formed in the inwardly extended portions of the links 20 and 21, adapted to slidably engage over the screws 42 and 43, respectively, secured to the disc 26, so that, when required, said disc and its stretching members 14, 15 may be moved in either longitudinal direction by the members 27, 28, without extending said stretching members. The screws 42 and 43 are provided with heads 44 and 45 respectively, as a means for adjusting the effective length of links 20 and 21.

A pair of tension springs 46 and 47 are secured to the stretching members 14 and 15, in proximity to the extremities thereof. Tension springs 46, 49 and 50, 51 are secured to the stretching members 14 and 15 in proximity to the extremities thereof, and are angularly extended inwardly therefrom and are secured to the disc 26. The screws 42 and 43 are adjustable for turning the same into position for the heads 44 and 45 to clamp the links 20 and 21 for actuation of the links 20 and 21 of Fig. 6 in the same manner as the links of the other figures of the drawings, in which latter the members 14 and 15 are projectable on actuation of the members 27 and 28.

It is understood that the latter described construction is also embodied in the links 20' and 21' and in the disc 26'. It is further understood that the springs 48, 49, 50 and 51 are constructed of considerably heavier material than the springs 46 and 47, which are only required to secure the engagement of the stretching members with the edges of the body member 10, where as the first mentioned springs are required to co-act with the pulling or sliding of the said stretching members.

Having thus described my invention what I claim as new and desire to secure by United States Letters Patent is:

1. A device of the class described comprising a flat, elongated body, a pair of projecting members slidably mounted on the opposing members slidably mounted on the opposite edges of said body, and means connecting said members.

2. A device of the class described comprising a flat, elongated, tapered body having its opposite edges curved in cross section, projecting arcuate members slidably mounted on said edges, and means connecting said members.

3. A device of the class described comprising a flat elongated body, projecting members slidably mounted on the opposite edges of said body, discs slidably mounted on opposite sides of said body intermediate said members, links connecting said discs with the respective slidable members, and flexible means attached to said discs and extending to one end of said body.

4. A device of the class described comprising a flat elongated body, arcuate projecting members slidably mounted on the opposite side of said body, discs slidably mounted on the flat sides of said body intermediate said members, links connecting said discs with said members, and flexible means attached to opposite sides of said discs and extending to the respective ends of said body.

5. A device of the class described comprising a flat elongated body, arcuate members loosely contacting with the opposite edges of said body, discs movably mounted on the flat sides of said body between said members, obliquely disposed links mounted at their opposite ends on the respective discs and arcuate members, and flexible means attached to said discs for moving the same to position said links in alignment, thereby extending said members outwardly from said body.

6. A device of the class described comprising a flat elongated body, a pair of members loosely mounted on the opposite edges of said body and having outwardly disposed arcuate edges, discs movably carried on the opposite flat sides of said body intermediate said members, resilient means holding said members against the edges of said body, obliquely disposed links terminally pivotally connecting said discs and said members, and flexible means attached to said discs for moving the latter to linearly dispose said links for extending said members against the action of said resilient means.

In testimony whereof I have affixed my signature.

SAMUEL HEILWEIL.